(12) United States Patent
Liu

(10) Patent No.: US 7,719,562 B2
(45) Date of Patent: May 18, 2010

(54) METHOD AND SYSTEM FOR HANDLING MULTIMEDIA CALLS

(75) Inventor: Zhenhua Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 915 days.

(21) Appl. No.: 11/521,626

(22) Filed: Sep. 15, 2006

(65) Prior Publication Data

US 2007/0076854 A1 Apr. 5, 2007

Related U.S. Application Data

(63) Continuation of application No. PCT/CN2006/000402, filed on Mar. 15, 2006.

(30) Foreign Application Priority Data

Mar. 17, 2005 (CN) ......................... 2005 1 0055420

(51) Int. Cl.
H04N 7/14 (2006.01)
(52) U.S. Cl. .................... 348/14.01; 455/519
(58) Field of Classification Search ............. 379/88.17, 379/202.01; 455/519; 348/14.01–14.08
See application file for complete search history.

(56) References Cited

U.S. PATENT DOCUMENTS

| | | | |
|---|---|---|---|
| 6,795,541 B2* | 9/2004 | Oren | 379/207.08 |
| 6,839,356 B2* | 1/2005 | Barany et al. | 370/401 |
| 7,068,643 B1* | 6/2006 | Hammond | 370/352 |
| 7,447,513 B2* | 11/2008 | Anttila et al. | 455/519 |
| 2004/0052245 A1* | 3/2004 | Kwon | 370/352 |

FOREIGN PATENT DOCUMENTS

| | | |
|---|---|---|
| CN | 1501606 | 6/2004 |
| EP | 1398941 | 3/2004 |
| GB | 2 405 285 | 2/2005 |
| KR | 2004042197 | 5/2004 |
| KR | 2005013684 | 2/2005 |
| WO | WO-02/052811 A1 | 7/2002 |

(Continued)

OTHER PUBLICATIONS

International Search Report for PCT/CN2006/000402, mailed Jun. 29, 2006.

(Continued)

*Primary Examiner*—Curtis Kuntz
*Assistant Examiner*—Maria El-Zoobi

(57) ABSTRACT

A method and system for handling multimedia calls is disclosed in which an IP multimedia terminal initiates a multimedia call request to a 3G terminal via a video inter-work device; the video inter-work device negotiates with 3G network and sets up a speech bearer between the video inter-work device and the 3G terminal when the 3G network is unable to support the multimedia call, then sets up a logical speech channel between the video inter-work device and the IP multimedia terminal, and makes the multimedia call fallback to a speech call. In accordance with the disclosed handling method and system provided, a multimedia call will fallback to a speech call when the 3G terminal does not support the multimedia call initiated by an IP multimedia terminal such that an H.324M video service is made more acceptable to users and complexity in using the service is reduced while improving user experience.

22 Claims, 4 Drawing Sheets

FOREIGN PATENT DOCUMENTS

WO WO-03/103243 A1 12/2003
WO WO-2004/091174 A1 10/2004

OTHER PUBLICATIONS

"Universal Mobile Telecommunications System (UMTS); Technical Realization of Circuit Switched (CS) Multimedia Service; UDI/RDI Fallback and Service Modification," ETSI Standards, European Telecommunications Standards Institute, Sophia-Antipo, FR, Mar. 2004.
Supplementary European Search Report for EP 06 72 2055, dated Apr. 5, 2007.
International Preliminary Report on Patentability for International Application No. PCT/CN2006/000402, dated Sep. 18, 2007.
Written Opinion for International Application No. PCT/CN2006/000402, dated Jun. 12, 2006.

* cited by examiner

METHOD AND SYSTEM FOR HANDLING MULTIMEDIA CALLS

CROSS-REFERENCES TO RELATED APPLICATIONS

This is a continuation of International Application No. PCT/CN2006/000402, which was filed on Mar. 15, 2006, and which, in turn, claimed the benefit of Chinese Patent Application No. 200510055420.0, which was filed on Mar. 17, 2005, the entire disclosures of which are hereby incorporated herein by reference.

BACKGROUND OF THE DISCLOSURE

1. Field of the Technology

The present invention relates to multimedia communication techniques, and more particular, to a method and system for handling multimedia calls.

2. Background of the Invention

The third-generation (3G) mobile communication systems are highlighted by the video service defined in the protocol of narrow-band low-rate multimedia communication architecture (H.324M). Along with the continuing development of next-generation networks (NGN) and IP multimedia networks, it has become a pressing issue to make a user terminal of a 3G system (hereinafter referred to as 3G terminal) and an IP multimedia terminal of an IP multimedia network able to inter-work in the video service. The IP multimedia terminal includes a terminal of IP-based multimedia communication architecture protocol (H.323) or a terminal based on the Session Initiation Protocol (SIP), i.e., a SIP multimedia terminal. Usually, a video inter-work conversion device is specially an equipment, e.g., a video gateway (VIG), used for implementing the inter-working between a 3G terminal (e.g. a mobile phone with H.324M video function) and an IP multimedia terminal in video service or speech service. FIG. 1 is a schematic diagram illustrating the inter-working between a 3G terminal and an H.323 terminal.

When an IP multimedia terminal initiates a multimedia call to a 3G terminal, the IP multimedia terminal calls the VIG first, and the VIG will initiate a multimedia call to the 3G terminal. The multimedia call in this application for patent refers to a call which complies with the H.324M protocol at 3G network. Compared with a speech call, a multimedia call includes the multimedia capability and is customarily referred to as a video call. If a 3G terminal is located in an area in which the H.324M video service is not supported due to roaming, network quality, or other reasons, the multimedia call that the VIG initiates to the 3G terminal will not be successful in the situation, i.e., the IP multimedia terminal will be unable to set up a multimedia call to the 3G terminal. In this case, as the H.324M video service is a circuit switched data services, the 3G network does not provide the service with a ring back tone and call failure tone during a dialing process, i.e., if the call fails, the calling user at the IP multimedia terminal is unable to have any prompt information of failure. From the viewpoint of use by a subscriber, the approach mentioned above will bring inconvenience to a subscriber of the H.324M video service, for example, a subscriber, when unable to learn that a call has failed, will wait blindly for the call to be put through or initiate the call request repeatedly, which will make the subscriber greatly unsatisfied with the H.324M video service.

SUMMARY OF THE INVENTION

A method for handling multimedia calls, such that, when a 3G terminal does not support a multimedia call initiated from an IP multimedia terminal, the multimedia call could fall back to a speech call and the IP multimedia terminal could still conduct speech communication with the 3G terminal.

A system for handling multimedia calls is provided, such that a multimedia call could fall back to a speech call when the 3G network does not support the multimedia call.

The specific solution in accordance with the present invention is as follows. A method for handling multimedia calls, includes the following steps: an IP multimedia terminal initiates a multimedia call request to a 3G terminal via a video inter-work device; the video inter-work device negotiates with a 3G network to set up a speech bearer between the video inter-work device and the 3G terminal when the 3G network is unable to support the multimedia call, then sets up a speech channel between the video inter-work device and the IP multimedia terminal, and makes the multimedia call fallback to a speech call.

A system for handling multimedia calls includes: a video inter-work device, 3G network and 3G terminals, and IP multimedia network and IP multimedia terminals; an IP multimedia terminal initiating a multimedia call request to a 3G terminal via the video inter-work device; the video inter-work device negotiating with the 3G network and setting up a speech bearer between the video inter-work device and the 3G terminal when the 3G network is unable to support the multimedia call, then setting up a speech stream between the video inter-work device and the IP multimedia terminal, and making the multimedia call fallback to a speech call.

As can be seen from the solution mentioned above, in accordance with the method and system for handling multimedia calls of the present invention, when an IP multimedia terminal initiates a multimedia call to a 3G terminal, if multimedia communication between the IP multimedia terminal and the 3G terminal is impossible due to a reason from the 3G network, such as the 3G user having not subscribed to the video service, the 3G terminal not supporting the video service, the user being in a GSM network, the user not willing to receive a multimedia call, the user not in the serving area, or the user having turned off, then make the multimedia call fallback to a speech call using the signaling of Integrated Services Digital Network User Part (ISUP). Furthermore, in case that the speech communication between the IP multimedia terminal and the 3G terminal is not successful either, the reason for the call failure can be returned to the IP multimedia terminal via the channel set up for the speech communication.

In the process mentioned above, it is not needed to upgrade any ISUP signaling. For a network supporting the ISUP setup message with two or more Bearer Capability (BC) parameters and the network node support select one BC from those BC parameters, the multimedia call request sent from a video gateway (VIG) to a 3G terminal will carry simultaneously the indication of the multimedia capability and the indication of the speech capability, and the 3G network will make a choice based on the conditions of the network and the 3G terminal. If the multimedia capability can not be supported, the 3G network will make the indication of the speech capability carried in the response message, and the VIG will set up a speech bearer to the 3G terminal based on the response message mentioned above, return a response to the IP multimedia terminal, and set up a speech channel between the VIG and the IP multimedia terminal.

For a network not supporting the ISUP setup message with two or more BC parameters, upon receiving a message from the 3G network of rejecting the multimedia call, the VIG automatically sends a speech call to the 3G network, and sets up a speech bearer between the VIG and the 3G terminal.

As can be seen from the above description, on one hand, this method makes the H.324M video service more acceptable to a user; on the other hand, since an automatic speech call sent from the VIG is invisible to the user of an IP multimedia terminal, the method may reduce the complexity in using the service and improves the experience of the user.

DETAILED DESCRIPTION OF PREFERRED EMBODIMENTS

Figure 1:
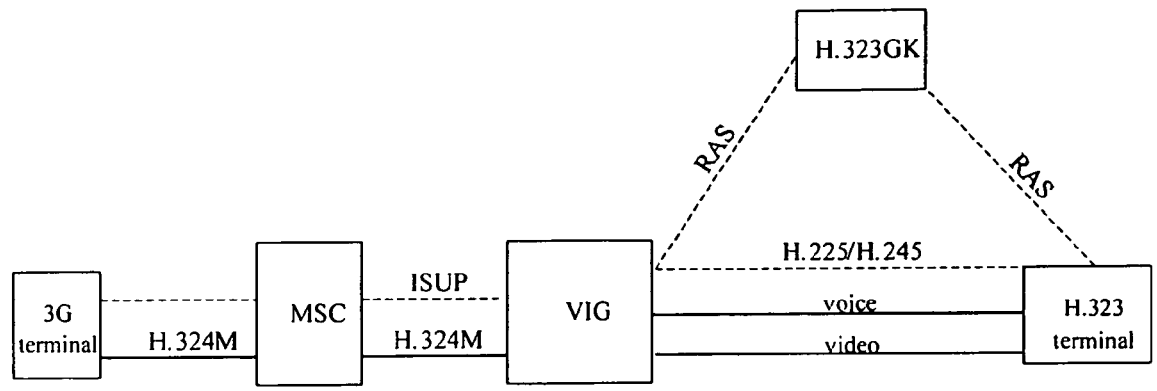
FIG. 1 is a schematic diagram illustrating the inter-working between a 3G terminal and an H.323 terminal in the prior art.

The present invention is hereinafter further described in detail with reference to the accompanying drawings as well as embodiments so as to make the objective, technical solution and merits thereof more apparent.

The present ISUP protocol provides the function of ISUP degradation, that is to say, the ISUP setup message can be with two or more BC parameters, i.e., it is allowed to carry multiple parameters of BC in a call request. Such BC parameters may be set for different types of services, e.g., for data services or speech services. When initiating a call, the calling user may carry simultaneously two or more BC parameters. The called user selects one BC from the parameters supported by itself and sets up a call acceptable to the called.

For a network supporting the ISUP setup message with two or more BC parameters, when initiating a multimedia call, the VIG carries two BC parameters, i.e., the multimedia capability for the H.324M video service and the speech capability for a speech service. The Visited Mobile Switch Centre (VMSC) of the called user, upon receiving the multimedia call request mentioned above, may permit the calling user to conduct speech communication according to the BC parameter of a speech service even that the VMSC rejects the multimedia call request from the calling user. This method requires that every MSC on the path from the VIG to the 3G terminal support the ISUP setup message with two or more BC parameters.

As can be seen from the existing network devices and the networking conditions, however, most Mobile Switching Center (MSC)s can not support the ISUP setup message with two or more BC parameters. For a network not supporting the ISUP setup message with two or more BC parameters, the present invention also puts forward a handling method for multimedia calls such that a multimedia call could fallback to a speech call without upgrading the devices in the entire network. The method includes specifically:
when an IP multimedia terminal initiates a multimedia call to a 3G terminal, the multimedia call is sent to the VIG. According to the existing protocol, the VIG will initiate to the 3G terminal a call containing the multimedia capability. The VIG communicates with 3G network side of the VIG using ISUP signaling, i.e., the VIG is considered by the MSC of the 3G system as an equivalent MSC. Once one of the following situations occurs, such as the user of the 3G terminal having not subscribed to the video service, or the 3G terminal used by the subscriber not supporting the video service, or the user being currently in a GSM network, or the user not willing to receive a multimedia call, or the user being not in the serving area, or the user having turned off the terminal, or insufficient balance in the user's account, the multimedia call initiated by the VIG to the 3G terminal will fail. At this time the MSC of the 3G terminal will return a failure value to the VIG using an ISUP signaling. Upon receiving the failure value mentioned above, the VIG will automatically initiate a speech call to the 3G terminal. The speech call is sent in the signaling format defined in accordance with the existing protocol without the need of intervention from the IP multimedia terminal.

Herein, the method by which the VIG initiates a speech call to the 3G terminal is similar to that for initiating a multimedia call. The only difference is that the BC parameter in the ISUP message sent by the VIG for initiating a multimedia call carries the multimedia capability while the BC parameter in the ISUP message for initiating a speech call is the speech capability.

At the IP network side of the VIG, in case that the IP multimedia terminal includes an H.323 terminal, the VIG is an H.323 gateway, following the H.323 protocol, the H.245 protocol, and etc. If the VIG receives a failure value returned by the ISUP signaling, and carries only the speech codec information instead of the video codec information when negotiating in a TCS procedure with the H.323 terminal, the communication path between the 3G terminal and the H.323 terminal will only provide speech communications for this call.

In case that the IP multimedia terminal includes a SIP multimedia terminal, the VIG is a SIP gateway, following the SIP protocol. Upon receiving a failure value returned by the ISUP signaling, the VIG sends a SIP negotiation message carrying the speech capability directly to the SIP multimedia terminal. Then, only a logical speech channel is set up between the VIG and the SIP multimedia terminal used for transferring speech media streams.

In this method, the call request the VIG sends to the 3G network may simultaneously carry the multimedia capability and the speech capability. Upon deciding that the call can not be supported, the 3G network will return to the VIG a response of call failure, i.e., the 3G network is unable to support the mode of selecting one from two; upon receiving the response of call failure, the VIG sends to the 3G network a speech call request again carrying the speech capability, and sets up a speech bearer to the 3G terminal.

In accordance with the method under the circumstances that the network does not support the ISUP setup message with two or more BC parameters, when the VIG receives a failure value of the multimedia call, the speech call sent to the 3G terminal is automatically initiated by the VIG, and the automatic initiated speech call is invisible to the user using the IP multimedia terminal. Thus, the H.324M video service is provided in a more humanized way, and the method reduces the complexity of using the IP multimedia terminal by a user to a certain extent.

Whether the multimedia call falls back to a speech call by means of ISUP degradation or by the method of the VIG calling the 3G terminal again, a speech channel is able to be set up between the VIG and the IP multimedia terminal. Thus, when the 3G terminal is not in the serving area or has been turned off, the dialing failure tone played by the 3G network will be transferred to the IP multimedia terminal via the speech channel between the VIG and the IP multimedia terminal such that the user of the IP multimedia terminal is able to hear the reason of call failure.

Figure 2:
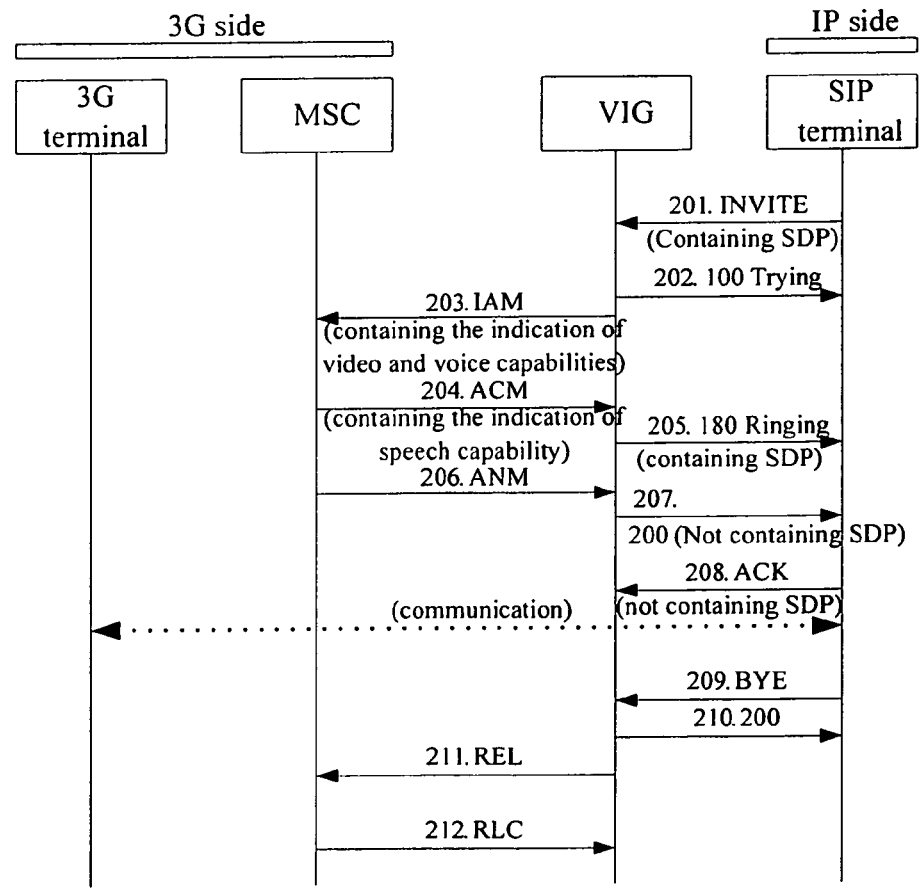
FIG. 2 is the flowchart for a SIP multimedia terminal initiating a multimedia call to a 3G terminal and performing Integrated Services Digital Network User Part (ISUP) degradation in the first embodiment of the present invention.

FIG. 2 is the flowchart for a SIP multimedia terminal initiating a multimedia call to a 3G terminal in the first embodiment of the present invention, during which one operation of ISUP degradation is carried out. As shown in the figure, the procedure includes specifically:

Step 201-202: upon receiving an INVITE message sent from a SIP multimedia terminal, the VIG returns to the SIP multimedia terminal a message of 100 Trying, indicating that the VIG is handling the INVITE message mentioned above. The Session Description Protocol (SDP) carried in the INVITE message includes the multimedia capability and the speech capability.

Step 203: the VIG sends to the MSC an IAM message, which carries two BC parameters, i.e., the multimedia capability and the speech capability.

Step 204: the MSC decides based on the actual conditions that the 3G terminal is unable to receive a multimedia call, therefore, the ACM message sent by the MSC to the VIG carries only the indication of the speech capability, indicating that the multimedia call requested by the VIG has been rejected and the 3G network can only accept speech communication.

In this step, since the MSC supports the ISUP setup message with two or more BC parameters, the multimedia call can directly fallback to a speech call.

Step 205: the VIG learns according to the ACM message that the requested multimedia call has failed, thus sends the SDP carrying the speech capability to the SIP multimedia terminal via a message of 180 Ringing to inform the SIP multimedia terminal that only speech communication can be supported currently while the multimedia capability can not be used.

Step 206-208: when the speech bearer is available at the 3G network, the MSC returns an ANM message to the VIG. Upon receiving the ANM message mentioned above, the VIG sends to the SIP multimedia terminal a message of 200. After the SIP multimedia terminal returns an ACK message, the 3G terminal and SIP multimedia terminal start speech communication.

Step 209-212: upon hanging up at the end of the communication, the SIP multimedia terminal sends a BYE message to the VIG. The VIG returns a message of 200 to the SIP multimedia terminal, and sends to the MSC a REL message. Upon receiving the REL message, the MSC releases the speech bearer of the 3G network, and returns a RLC message to inform the VIG that the release is completed.

In the procedure mentioned above, when the VIG learns, according to the received ACM message, that the multimedia call request has been rejected by the 3G network, no multimedia capability will be carried in the message of 180 Ringing returned to the SIP multimedia terminal. Based on the existing SIP protocol, a speech channel between a VIG and a SIP multimedia terminal can be set up flexibly, which will not be described further here.

Figure 3:
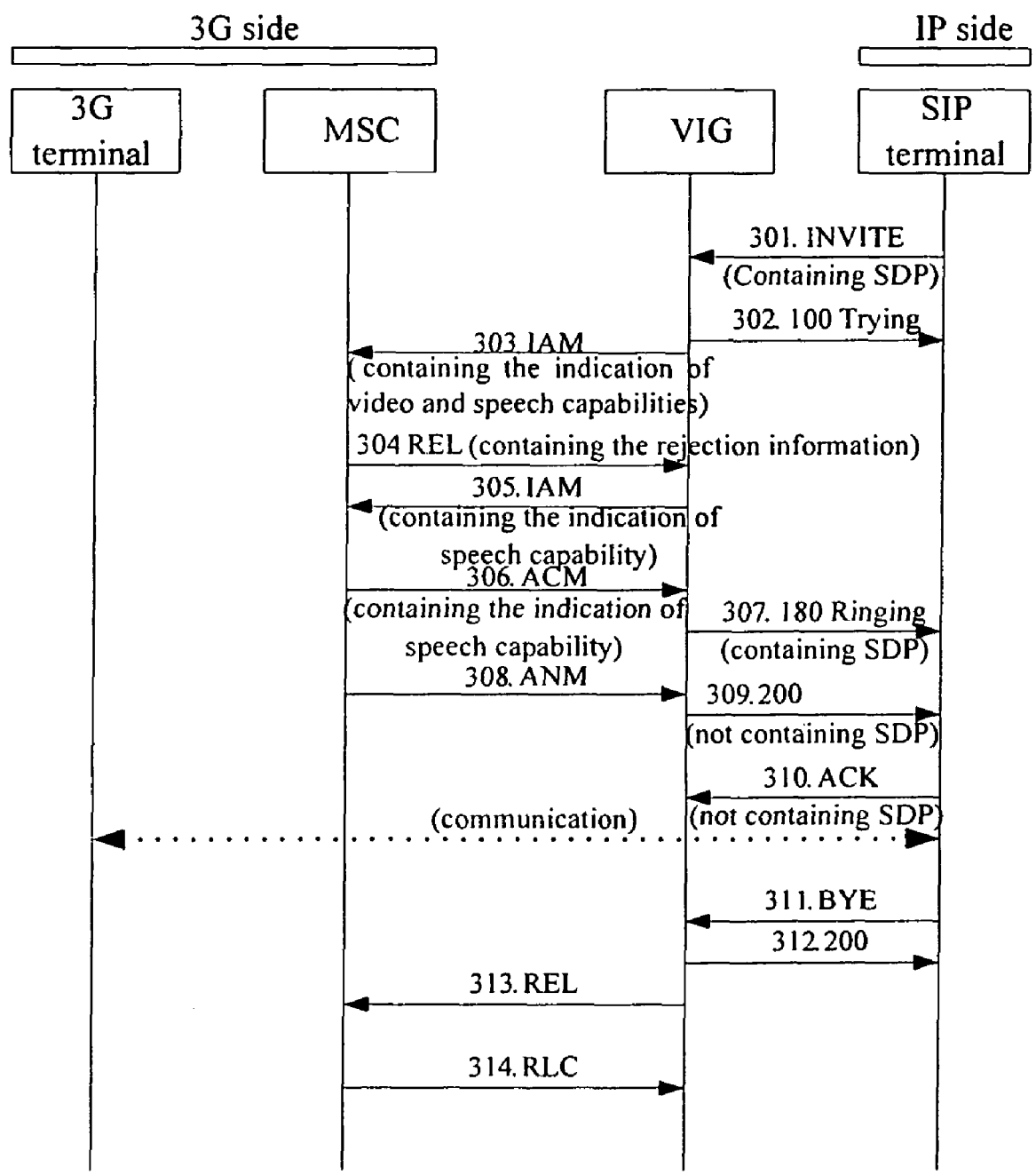
FIG. 3 is the flowchart for a SIP multimedia terminal initiating a multimedia call to a 3G terminal in the second embodiment of the present invention.

FIG. 3 is the flowchart for a SIP multimedia terminal initiating a multimedia call to a 3G terminal in the second embodiment of the present invention.

Steps 301-303 are performed in the same way as Steps 201-203 in FIG. 2, which will not be described further here.

Step 304: upon receiving the IAM message, the MSC of the 3G decides that the 3G terminal is unable to receive a multimedia call, thus directly sends a REL message to reject the multimedia call. The REL message carries the information of rejection.

Step 305: upon receiving the REL message indicating the rejection, the VIG re-initiates to the MSC a speech call, i.e., the VIG sends to the MSC an IAM message carrying the speech capability. In the procedure mentioned above, the SIP multimedia terminal does not learn that the VIG has re-initiates a call, i.e., the process of re-initiating a call is shielded from the SIP multimedia terminal.

Step 306: the MSC returns to the VIG an ACM response message, carrying the indication of the speech capability. Thereafter, the VIG sends a message of 180 Ringing to the SIP multimedia terminal, and sets up a speech channel between the VIG and the SIP multimedia terminal.

Steps 308-314 are performed in the same way as Steps 206-212 in FIG. 2, which will not be described further here.

Figure 4:
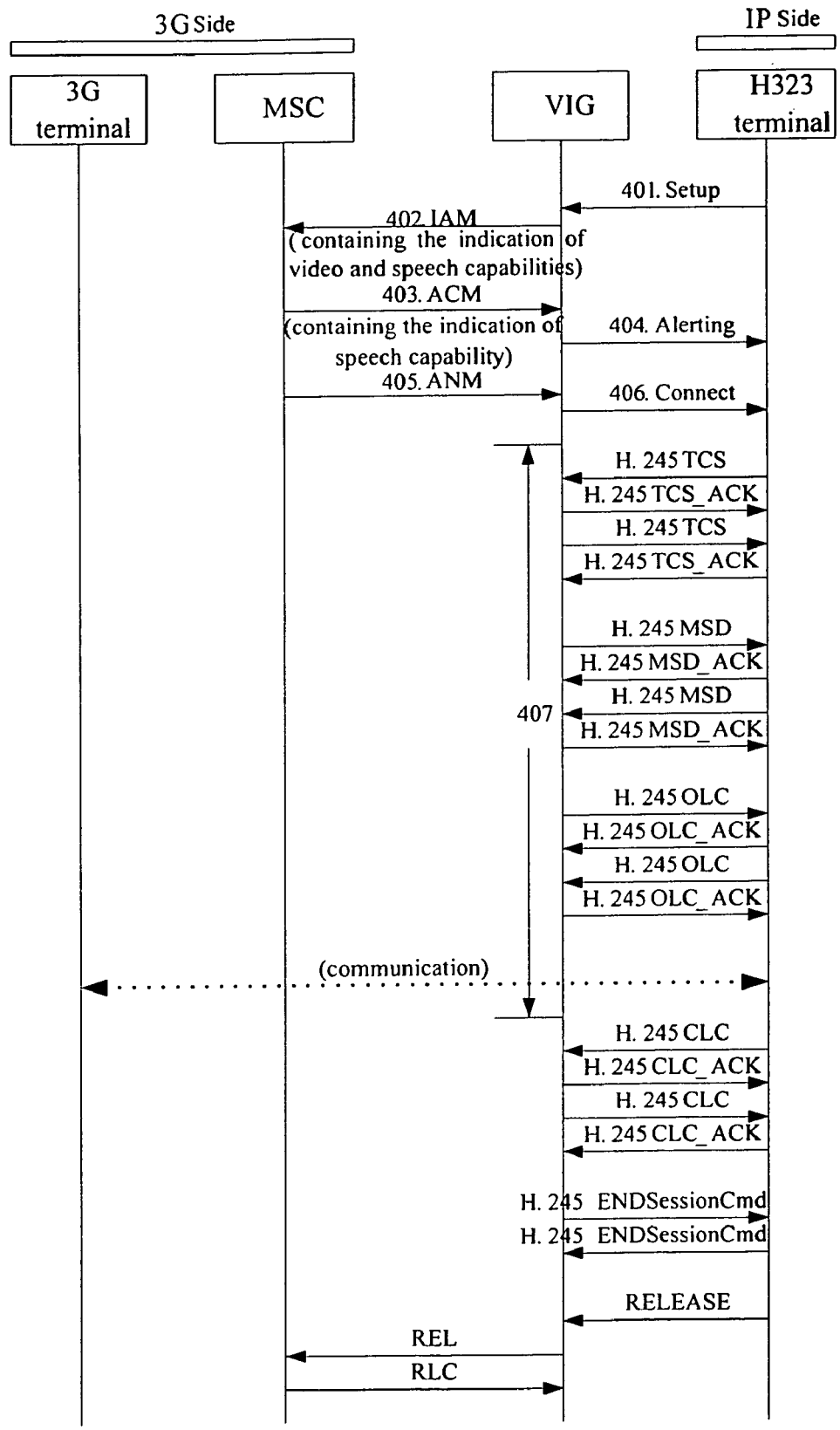
FIG. 4 is the flowchart for an H.323 terminal initiating a multimedia call to a 3G terminal and performing ISUP degradation in the third embodiment of the present invention.

FIG. 4 is the flowchart of slow start-up of an H.323 terminal calling a 3G terminal in the third embodiment of the present invention, wherein one operation of ISUP degradation is performed. As shown in the figure, the procedure includes specifically:

Steps 401-402: an H.323 terminal sends a SETUP message to the VIG, and the VIG sends to the MSC an IAM message, which carries the multimedia capability and the speech capability.

Step 403: the MSC, based on its own conditions, returns an ACM message to the VIG. The ACM message contains only the speech capability, i.e., the 3G has rejected the request of the VIG for the multimedia capability.

Steps 404-406: upon receiving the ACM message, the VIG sends an Alerting message to the H.323 terminal. Thereafter, the VIG will receive an ANM message sent by the MSC, which indicates that the 3G network is ready for speech communication. At this time, the VIG will return a Connect message to the H.323 terminal.

Step 407: the H.323 terminal and the VIG perform an H.245 TCS procedure, informing each other of the codec information supported by each side. Since the 3G network has rejected the multimedia call, the VIG will not include the video codec information in the TCS sent from the VIG itself. The H.323 terminal learns, according to the TCS mentioned above, that this session does not support video media streams. Thus, only the speech channel will be opened when the OLC procedure is performed. Thereafter, the H.323 terminal and the 3G terminal enter the state of speech communication.

Alternatively, during the TCS procedure, the VIG may inform the H.323 terminal of the video codec information and the speech codec information simultaneously. In the subsequent OLC procedure, if the H.323 terminal requests to open the video channel, the VIG will directly reject this request for opening the video channel so as to ensure that only a speech channel is set up between the H.323 terminal and the VIG.

Based on the existing H.323 protocol, a speech channel between a VIG and an H.323 terminal can be set up flexibly, which will not be described further here.

Figure 5:
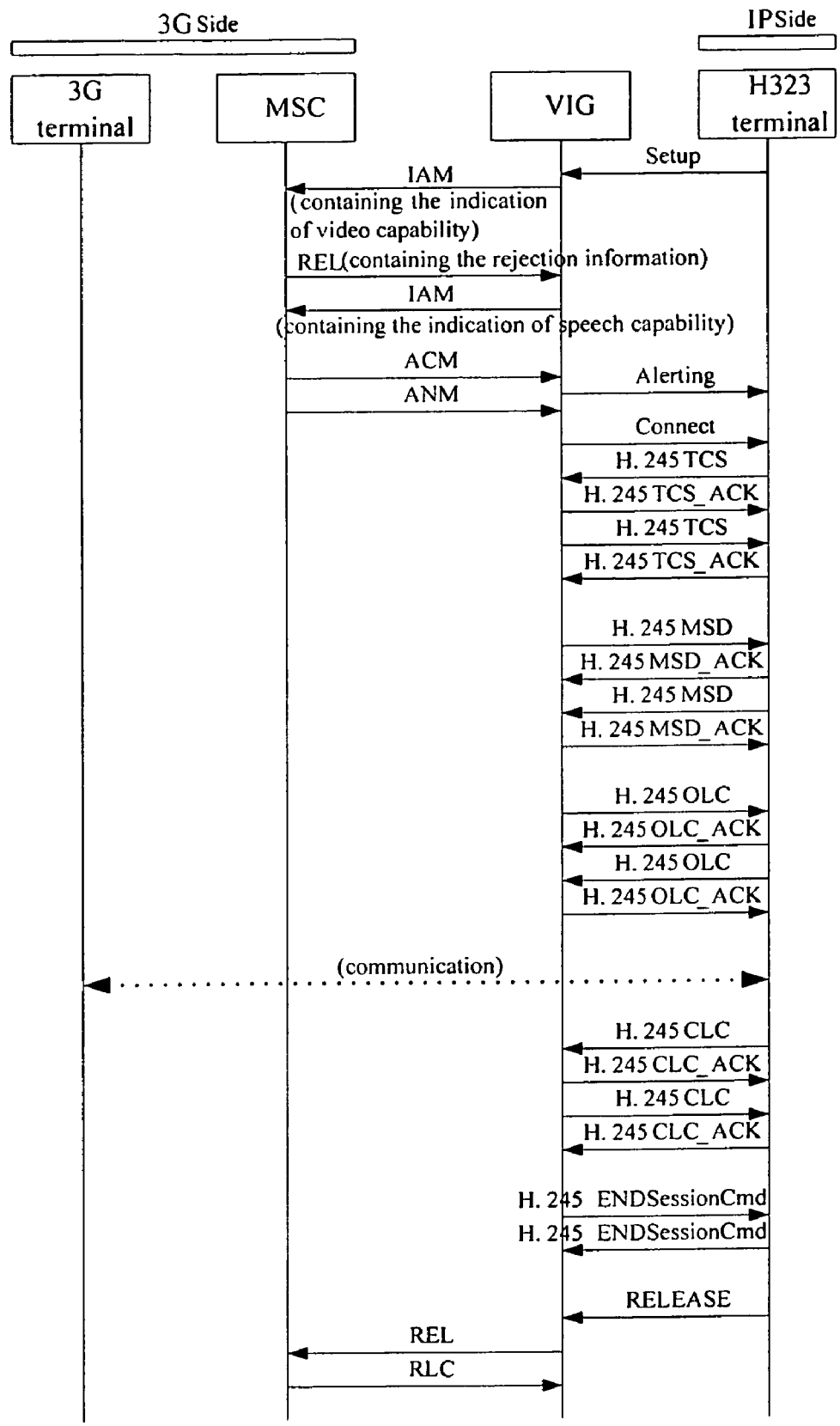
FIG. 5 is the flowchart for an H.323 terminal initiating a multimedia call to a 3G terminal in the fourth embodiment of the present invention.

FIG. 5 shows the handling procedure of an H.323 terminal calling a 3G terminal in the fourth embodiment of the present invention, in which the difference from FIG. 4 is:

the first IAM message sent by the VIG to the MSC carries only the multimedia capability. Since the 3G network does not support the multimedia capability, the MSC returns a REL message to reject the multimedia call request from the VIG. Upon receiving the REL message mentioned above, the VIG sends a second IAM message to the MSC, which carries the speech capability. As the speech service is a common service, which can be supported by all the existing 3G networks, the MSC returns an ACM confirmation to the VIG. The subsequent procedure is the same as in FIG. 4, which will not be described further here.

In accordance with the embodiments of the present invention, when the 3G network is able to support a multimedia call, sets up a video bearer between a video inter-work device and a 3G terminal according to the existing standard, and then set up a video channel between the video inter-work device and the IP multimedia terminal, and eventually implement the multimedia call between the IP multimedia terminal and the 3G terminal.

Corresponding to the method mentioned above, the embodiment of the present invention provides a system for handling multimedia calls, including a video inter-work device, 3G network and 3G terminals, and IP multimedia network and IP multimedia terminals, wherein the video inter-work device communicates with the 3G network by ISUP signaling, and communicates with the IP multimedia network using the SIP protocol or H.323 protocol.

An IP multimedia terminal initiates a multimedia call request to a 3G terminal via the video inter-work device; the video inter-work device negotiates with the 3G network, when the 3G network is unable to support the multimedia call, sets up a speech bearer between the video inter-work device and the 3G terminal, and then sets up a speech channel between the video inter-work device and the IP multimedia terminal to make the multimedia call fallback to a speech call.

As can be seen from the above embodiments, a multimedia call will fall back to a speech call when the 3G terminal does not support the multimedia call initiated by an IP multimedia terminal such that the H.324M video service could be made more acceptable to users and the complexity in using the service is reduced while the experience of users is improved.

The above descriptions are just preferred embodiments rather than limitations of the present invention. Any change, modification and substitution can be made by people skilled in this field without departing from the scope and spirit of the invention and therefore will be protected as set up in the claim.

The invention claimed is:

1. A method for handling a multimedia call, comprising:
a video inter-work device receiving a multimedia call request to a 3G terminal, which request is initiated by an IP multimedia terminal via the video inter-work device;
the video inter-work device-negotiating with a 3G network and receiving a response indicating a multimedia call failure from the 3G network when the 3G network is unable to support the multimedia call;
upon receiving the response indicating the multimedia call failure, the video inter-work device automatically initiating a speech call request to the 3G network carrying a speech capability and setting up a speech bearer between the video inter-work device and the 3G terminal; and
the video inter-work device setting up a speech channel between the video inter-work device and the IP multimedia terminal, and making the multimedia call fall back to a speech call.

2. The method according to claim 1, wherein, the step of negotiating with the 3G network comprises:
the video inter-work device sending, to the 3G network, the multimedia call request carrying a multimedia capability.

3. The method according to claim 1, wherein the response indicating the multimedia call failure comprises an Integrated Services Digital Network User Part (ISUP) message carrying a failure value.

4. The method according to claim 1, wherein the step of negotiating with the 3G network comprises:
the video inter-work device sending to the 3G network the multimedia call request carrying simultaneously a multimedia capability and the speech capability.

5. The method according to claim 1, wherein the IP multimedia terminal is a Session Initiation Protocol (SIP) terminal, and
wherein the step of setting up the speech channel between the video inter-work device and the IP multimedia terminal comprises:
the video inter-work device sending to the SIP multimedia terminal a SIP negotiation message carrying the speech capability, and setting up the speech channel between the SIP multimedia terminal and video inter-work device.

6. The method according to claim 3, wherein the IP multimedia terminal is a Session Initiation Protocol (SIP) terminal, and
wherein the step of setting up the speech channel between the video inter-work device and the IP multimedia terminal comprises:
the video inter-work device sending to the SIP multimedia terminal a SIP negotiation message carrying the speech capability, and setting up the speech channel between the SIP multimedia terminal and video inter-work device.

7. The method according to claim 4, wherein the IP multimedia terminal is a Session Initiation Protocol (SIP) terminal, and
wherein the step of setting up the speech channel between the video inter-work device and the IP multimedia terminal comprises:
the video inter-work device sending to the SIP multimedia terminal a SIP negotiation message carrying the speech capability, and setting up the speech channel between the SIP multimedia terminal and video inter-work device.

8. The method according to claim 1, wherein the IP multimedia terminal is an H.323 terminal, and
wherein then-the step of setting up the speech channel between the video inter-work device and the IP multimedia terminal comprises:
the video inter-work device carrying speech codec information in the negotiation with the H.323 terminal in a Terminal Capability Set (TCS) procedure; and
the H.323 terminal acquiring the speech codec information, and setting up the speech channel with the video inter-work device.

9. The method according to claim 3, wherein the IP multimedia terminal is an H.323 terminal, and
wherein the step of setting up the speech channel between the video inter-work device and the IP multimedia terminal comprises:
the video inter-work device carrying speech codec information in the negotiation with the H.323 terminal in a Terminal Capability Set (TCS) procedure; and
the H.323 terminal acquiring the speech codec information, and setting up the speech channel with the video inter-work device.

10. The method according to claim 4, wherein the IP multimedia terminal is an H.323 terminal, and
wherein the step of setting up the speech channel between the video inter-work device and the IP multimedia terminal comprises:
the video inter-work device carrying speech codec information in the negotiation with the H.323 terminal in a Terminal Capability Set (TCS) procedure; and
the H.323 terminal acquiring the speech codec information, and setting up the speech channel with the video inter-work device.

11. The method according to claim 8, further comprising:
the video inter-work device informing the H.323 terminal of video codec information in the TCS procedure, and in an Open Logical Channel (OLC) procedure, if the H.323 terminal initiates a request for setting up a video channel to the video inter-work device, the video inter-work device rejecting the request.

12. The method according to claim 1, further comprising:
the video inter-work device sending a reason for call failure provided by the 3G network to the IP multimedia terminal via the speech channel between the video inter-work device and the IP multimedia terminal after making the multimedia call fall back to the speech call.

13. The method according to claim 1, wherein situations in which the multimedia call can not be supported comprise any one of: the 3G terminal having not subscribed to an H.324M video service, the 3G terminal not supporting the multimedia call, the 3G terminal being in a GSM network, the 3G terminal not accepting the multimedia call, the 3G terminal not being in the serving area, the 3G terminal having been turned off, or there being an insufficient balance in an account of the 3G terminal.

14. The method according to claim 1, wherein the video inter-work device comprises a video gateway.

15. A network device for handling a multimedia call, configured to implement a method comprising the steps of:
receiving a multimedia call request to a 3G terminal, which request is initiated by an IP multimedia terminal via the network device;
negotiating with a 3G network and receiving a response indicating a multimedia call failure from the 3G network when the 3G network is unable to support the multimedia call;
automatically initiating a speech call request carrying a speech capability to the 3G network and setting up a speech bearer between the network device and the 3G terminal upon receiving the response indicating the multimedia call failure; and
setting up a speech channel between the network device and the IP multimedia terminal, and making the multimedia call fall back to a speech call.

16. The network device according to claim 15, wherein the network device is further configured to:
negotiate with the 3G network by sending, to the 3G network, the multimedia call request carrying a multimedia capability or a multimedia capability and the speech capability.

17. A system for handling a multimedia call, comprising:
a video inter-work device configured to:
receive a multimedia call request to a 3G terminal, which request is initiated by an IP multimedia terminal via the video inter-work device;
negotiate with a 3G network, and receive a response indicating a multimedia call failure from the 3G network when the 3G network is unable to support the multimedia call;
automatically initiate a speech call request carrying a speech capability to the 3G network and set up a speech bearer between the video inter-work device and the 3G terminal upon receiving the response indicating the multimedia call failure; and
set up a speech channel between the video inter-work device and the IP multimedia terminal, and make the multimedia call fall back to a speech call.

18. The system according to claim 17, wherein the system further comprises a Mobile Switching Center (MSC) in the 3G network, and
wherein the video inter-work device is configured to negotiate with the MSC and receive the response indicating a multimedia call failure from the MSC when the MSC determines that the multimedia call can not be supported, and automatically initiate the speech call request carrying the speech capability to the MSC.

19. A method for handling a multimedia call, comprising:
a video inter-work device receiving a multimedia call request to a 3G terminal, which request is initiated by an IP multimedia terminal via the video inter-work device;
the video inter-work device sending to the 3G network the multimedia call request carrying simultaneously a multimedia capability and a speech capability;
the video inter-work device receiving a response indicating a multimedia call failure carrying the speech capability from the 3G network when the 3G network is unable to support the multimedia call;
the video inter-work device setting up a speech bearer to the 3G terminal according to the speech capability carried in the response indicating the multimedia call failure; and
the video inter-work device setting up a speech channel between the video inter-work device and the IP multimedia terminal, and making the multimedia call fall back to a speech call.

20. The method according to claim 19, wherein the response indicating the multimedia call failure comprises an Integrated Services Digital Network User Part (ISUP) message carrying a failure value.

21. The method according to claim 19, wherein the IP multimedia terminal is a Session Initiation Protocol (SIP) terminal, and
wherein the step of setting up a speech channel between the video inter-work device and the IP multimedia terminal comprises:
the video inter-work device sending to the SIP multimedia terminal a SIP negotiation message carrying the speech capability, and setting up the speech channel between the SIP multimedia terminal and video inter-work device.

22. The method according to claim 19, wherein the IP multimedia terminal is an H.323 terminal, and
wherein the step of setting up the speech channel between the video inter-work device and the IP multimedia terminal comprises:
the video inter-work device carrying speech codec information in the negotiation with the H.323 terminal in a Terminal Capability Set (TCS) procedure; and
the H.323 terminal acquiring the speech codec information, and setting up the speech channel with the video inter-work device.

* * * * *